United States Patent Office.

WILLIAM A. BALDWIN, OF CHICAGO, ILLINOIS, ASSIGNOR OF ONE-FOURTH TO AMMI A. THOMAS, J. CLEMENT SMITH, AND JAMES J. SHEEHY, ALL OF WASHINGTON, DISTRICT OF COLUMBIA.

COMBINING METALS WITH ALUMINUM.

SPECIFICATION forming part of Letters Patent No. 378,278, dated February 21, 1888.

Application filed July 20, 1887. Serial No. 244,830. (No specimens.)

*To all whom it may concern:*

Be it known that I, WILLIAM A. BALDWIN, a citizen of the United States, residing at Chicago, in the county of Cook and State of Illinois, have invented certain new and useful Improvements in Combining Metals With Aluminum; and I do declare the following to be a full, clear, and exact description of the invention, such as will enable others skilled in the art to which it appertains to make and use the same.

This invention relates to a direct process of extracting aluminum from substances bearing alumina, and combining the aluminum with other metals by the direct application of such substances with carbonaceous matter, sodium chloride, and the metal, all in a state of fusion, substantially as hereinafter specified and claimed.

My applications for patents, numbered respectively 234,818 and 234,820, relate to processes for extracting the metal aluminum from substances bearing alumina, and hence nothing claimed in said applications, or either of them, is claimed in this application.

My application No. 234,821 relates to the treatment of metal in a bath of fused clay, salt, and charcoal, but in such treatment the form of the metal is not changed by fusion or otherwise. The claims therefore in that case are unlike and do not conflict with the claim made in the application now under consideration.

While I have described the sodium chloride, carbonaceous matter, and substances bearing alumina, which when fused serve as a bath for the treatment of metals, yet it is not desired that such should be claimed broadly herein, as the same is made the subject-matter of a claim to an application for a patent which I have filed in the Patent Office under date of January 31, 1888.

In carrying out my process I first take, preferably, of dry pulverized clay one part, of pulverized charcoal one-fourth part, and of sodium chloride three parts, by weight, and bring the mixture to a state of fusion in a crucible or melting-pot. The proportions of charcoal and sodium chloride herein given may be varied somewhat, but I have found that the proportions mentioned have given satisfactory results. I next pour into the fused mixture of clay, charcoal and salt, molten metal—such as iron, steel, copper, or other metal—that I desire to combine with aluminum, and allow it to remain until combination of the aluminum is effected with the metal so introduced. A half-hour or more is required for this purpose, according to the amount of the charge. During this time the contents of the crucible must be kept in a state of fusion, and sometimes I find it desirable to stir the said contents. Finally I discharge the combined metals into suitable molds to form pigs or bars.

It is obvious that the clay, charcoal, and sodium chloride, and the metal desired to be combined with aluminum may all be fused in the same crucible at the same time with like result; but metals which melt at a low temperature—such as zinc and tin—should not be introduced until the contents of the crucible are fused. It is also obvious that coal, coke, or other substance carrying carbon may be used instead of charcoal, but I have found that the latter gives the best results.

The process I have described above refers to the combination of aluminum with other metals directly from clay; but there are substances that contain more aluminum than clay—such as bauxite and corundum. Such substances may be used in the same manner as clay by increasing the proportions of coal and sodium chloride.

In my experiments I find that common clay in its natural state and without any preparation whatever, except drying and pulverizing, has proved the substance from which aluminum is most easily extracted. I find also that fused metal may sometimes be poured direct upon and into an unfused mass of clay, carbonaceous matter, and sodium chloride with good results, but I do not deem that process as economical or reliable as that which I have heretofore described.

While I have described in this application that clay, charcoal, and sodium chloride, and the metal desired to be combined with aluminum may all be fused in the same crucible at the same time, yet it is not desired to claim that method herein, as the same is described and claimed in my application filed April 14, 1887, Serial No. 234,819, and in the application last mentioned the bath of fused clay, carbonaceous matter, and sodium chloride, in the proportions set forth, are also described.

I claim as my invention—

The process of combining a metal with aluminum, consisting in first fusing clay or like substances containing alumina with carbonaceous matter and sodium chloride, the sodium chloride being in excess of the other substances, fusing the metal to be combined, and introducing the metal thus fused into the said fused mass, substantially as specified.

In testimony whereof I affix my signature in presence of two witnesses.

WILLIAM A. BALDWIN.

Witnesses:
I. S. BAKER,
T. E. TURPIN.